US009582284B2

(12) United States Patent
Bell, Jr. et al.

(10) Patent No.: US 9,582,284 B2
(45) Date of Patent: Feb. 28, 2017

(54) PERFORMANCE OF PROCESSORS IS IMPROVED BY LIMITING NUMBER OF BRANCH PREDICTION LEVELS

(75) Inventors: Robert H. Bell, Jr., Austin, TX (US); Wen-Tzer T. Chen, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 644 days.

(21) Appl. No.: 13/308,696

(22) Filed: Dec. 1, 2011

(65) Prior Publication Data
US 2013/0145135 A1     Jun. 6, 2013

(51) Int. Cl.
*G06F 9/38*     (2006.01)
*G06F 11/30*    (2006.01)

(52) U.S. Cl.
CPC .......... *G06F 9/3844* (2013.01); *G06F 9/3842* (2013.01); *G06F 11/30* (2013.01)

(58) Field of Classification Search
CPC .................................................. G06F 9/3842
USPC ....................................................... 712/239
See application file for complete search history.

(56) References Cited

U.S. PATENT DOCUMENTS

| 6,282,663 | B1 * | 8/2001 | Khazam ........................ 713/320 |
| 7,389,403 | B1 | 6/2008 | Alpert et al. |
| 7,600,135 | B2 | 10/2009 | Jones |
| 7,627,864 | B2 | 12/2009 | Du |
| 7,802,236 | B2 | 9/2010 | Calter et al. |
| 8,037,893 | B2 * | 10/2011 | Aguilar et al. ................. 137/12 |
| 2006/0224872 | A1 * | 10/2006 | Shihadeh ..................... 712/239 |
| 2007/0133329 | A1 * | 6/2007 | Braun et al. .................. 365/212 |
| 2008/0222489 | A1 * | 9/2008 | Barrett et al. ................. 714/758 |
| 2009/0307697 | A1 | 12/2009 | Hurley et al. |
| 2010/0082867 | A1 * | 4/2010 | Adachi et al. ................ 710/261 |
| 2013/0124885 | A1 * | 5/2013 | Davis et al. .................. 713/320 |

OTHER PUBLICATIONS

Brooks et. al., "Power-Aware Micro architecture: Design and Modeling Challenges for Next-Generation Microprocessors", IEEE Micro, Nov.-Dec. 2000, pp. 26-44.
Ungerer, et. al., "A survey of Processors with Explicit Multi Threading", ACM Computing Survey, v. 35, n. 1, Mar. 2003, pp. 29-63.
Hughes et. al., "Accelerating Multi-core Processor Design Space Evaluation using Automatic Multi-threaded Workload Synthesis" IEEE, 2008, pp. 163-172.

* cited by examiner

*Primary Examiner* — Andrew Caldwell
*Assistant Examiner* — Jyoti Mehta
(74) *Attorney, Agent, or Firm* — Jocelyn Cockburn (57) ABSTRACT

A method utilizes information provided by performance monitoring hardware to dynamically adjust the number of levels of speculative branch predictions allowed (typically 3 or 4 per thread) for a processor core. The information includes cycles-per-instruction (CPI) for the processor core and number of memory accesses per unit time. If the CPI is below a CPI threshold; and the number of memory accesses (NMA) per unit time is above a prescribed threshold, the number of levels of speculative branch predictions is reduced per thread for the processor core. Likewise, the number of levels of speculative branch predictions could be increased, from a low level to maximum allowed, if the CPI threshold is exceeded or the number of memory accesses per unit time is below the prescribed threshold.

22 Claims, 5 Drawing Sheets

PERFORMANCE OF PROCESSORS IS IMPROVED BY LIMITING NUMBER OF BRANCH PREDICTION LEVELS

BACKGROUND

The present invention relates to processors, and more specifically, to a method and apparatus for enhancing or improving the performance of the processors. In general, processors may be classified as single core and multiple cores. The multiple cores processors consist of processing logic, termed core, repeated several times on a substrate; while bus and memories are shared among the cores. A typical processor may be regarded as a set of entities consisting of logic to perform specific operations, for example, arithmetic operations, logic operations, and other data processing functions, coupled with mechanism to store data, retrieve data, and instructions from memory.

A measure of performance of a processor is the number of instructions executed per clock cycle. The current trend in processor technology is to increase this number; thereby improving the performance of the processor. Several techniques and features have been added to the architecture of processors to achieve this end. Some examples of features and techniques include cache memories, translation look up blocks (TLB), pipelining, branch prediction logic, etc. One area of concern is the branch prediction logic, which guesses the path through the code that the processor will take. If the guess is correct, the feature does enhance the performance of the processor. However, if the guess or prediction is in error (i.e. wrong), this may reduce the performance of the processor rather than enhance it. The likelihood of under performance by the processor due to erroneous branch prediction is addressed in the embodiment set forth herein.

SUMMARY

According to one embodiment of the present invention, periods of high pipeline and memory bandwidth utilization for the processor are detected, and in response thereto the number of levels of branch prediction is dialed down (reduced). Likewise, the number of levels of branch prediction is dialed up (increased) to a permissible allowed level during periods of low pipe line and memory bandwidth utilization. By dynamically adjusting levels of predictive branches, based on memory bandwidth utilization and/or activities of the processor or other means, the level of speculation in the processor is reduced, resulting in enhanced performance. A system for implementing the embodiment is provided. In addition, a program product for implementing the method is, also, provided.

In particular, the cycles-per-instruction (CPI) is determined for the processor. Also, the number of memory accesses (NMA) per unit time for the processor is determined. At least two thresholds, one relating to the CPI and the other relating to the NMA, are established. The threshold relating to CPI is termed CPI threshold, whereas the threshold relating to NMA is termed NMA threshold. The Performance Monitor Unit (PMU) provides a value or count, for the CPI that is compared with the CPI threshold. The PMU, also, provides a value or count, for the NMA, that is compared with the NMA threshold. If the CPI count or value is below the CPI threshold and the NMA count or value is above the NMA threshold, this indicates that the processor is busy (operating at maximum capacity); and the number of levels of speculative branches is ramped down (reduced). The state of the processor and/or number of memory accesses per unit time are monitored, on a periodic basis; and as their states become less busy, the number of levels of speculative branches ramps up (increase) to the maximum allowed level. The adjustments, UP or DOWN, may be performed in sequential order or in any other order prescribed by the designer. By determining the state of utilization phase (high or low) for the processor and utilization at the memory interface the number of levels of branch prediction can be adjusted accordingly.

DETAILED DESCRIPTION

Figure 1:
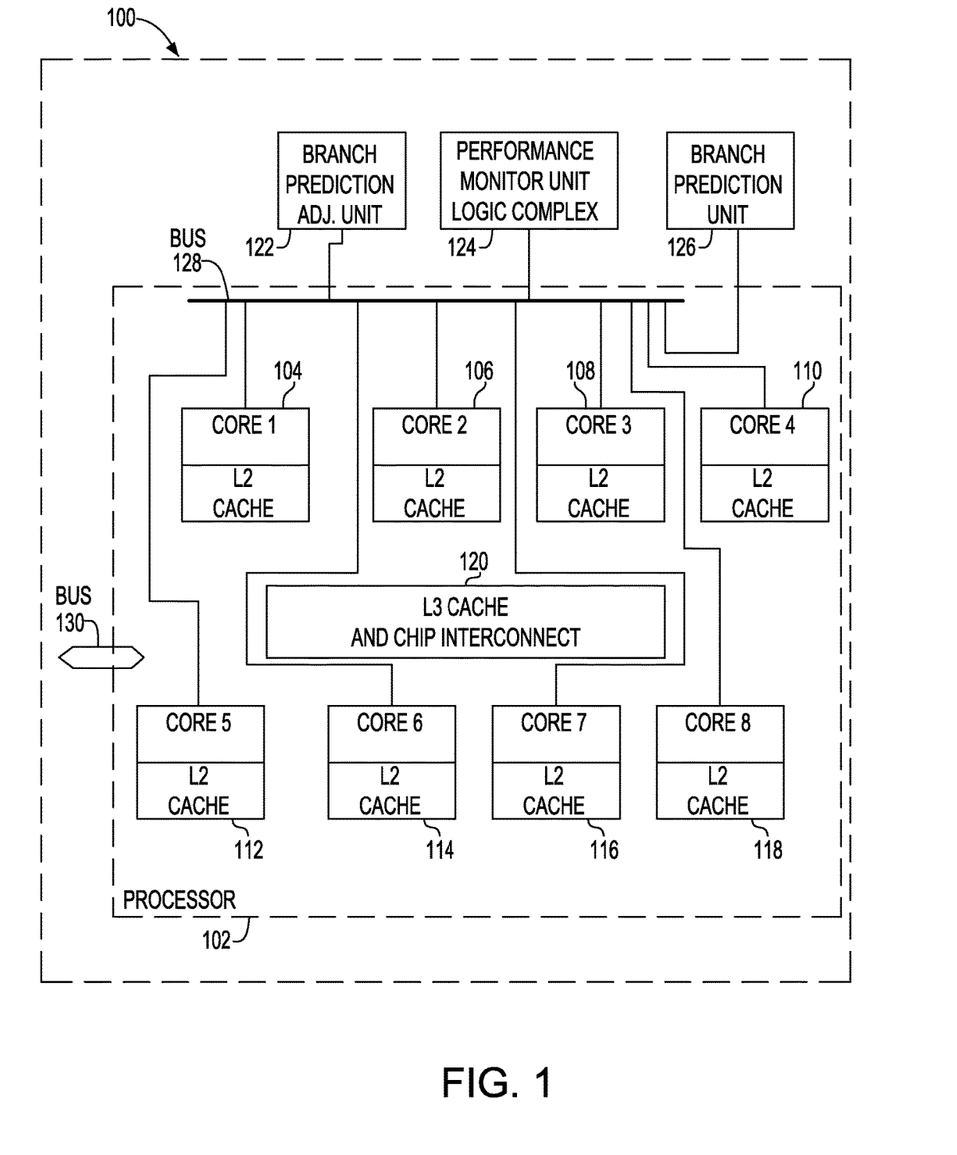
FIG. 1 is a schematic of an exemplary system according to an embodiment of the invention.

With reference now to FIG. 1, there is shown system 100, according to an exemplary embodiment of the invention, that adjusts the levels of allowable branch predictions based on memory bandwidth utilization or core pipe line utilization or both. System 100 includes a multi core processor, such as processor 102, which includes cores 104-118. It should be understood although eight cores are shown; they should be construed as an exemplary showing, explaining the embodiment, rather than a limitation on the embodiment. Because the multi core processor 102 may include any number of cores. The multi core processor 102 further includes L3 cache with chip interconnect 120. The system 100 further includes branch prediction adjustment (ADJ.) unit 122, performance monitor logic complex 124, and branch prediction unit 126. The named entities are inter connected as shown in FIG. 1 or in some other operative way. Each of the cores is provided with a L2 cache, useable as independent storage. The L3 cache is accessible to all cores via the chip or processor interconnect network, shown bundled with the L3 cache. It should be noted that the L3 cache is a separate entity from the chip interconnect network. But for purposes of simplicity it is shown in the bundled configuration. The cores 104-118 are shown inter connected to bus 128; whereas bus 128 is connected to branch adjustment unit 122, performance monitor logic complex 124, and branch prediction unit 126; all, of which, are, also, interconnected. The configuration of FIG. 1 should be construed as exemplary and not limiting the embodiment. For example, branch prediction adjustment unit 122, performance monitor logic complex 124, and branch prediction unit 126 could be integrated into each of the cores. Also, transmission paths between the cores need not go through bus 128. Instead, each core could be coupled by simplex connections to branch prediction adjustment unit 122, performance monitor logic complex 124, and branch prediction unit 126. Other types of configuration and connections can be provided by an artisan without departing from the scope and teachings of the embodiment. Bus 130 provides access into and out of processor 102.

Still referring to FIG. 1 each of the cores in processor 102 is provided with N threads, wherein N=4 in an exemplary embodiment. Also, each thread is provided or allowed M levels of branch predictions, M=3 in an exemplary embodiment. Power7 (Trademark of International Business Machines), a multi core chip or processor, provides similar functions and is incorporated herein by reference for further details. Each core can be viewed as a full processor with only one execution pipeline that is a sequence of processing steps through which an instruction or set of instructions is executed. Also, a thread may be viewed as a virtual processor. Other values for N and M can be adapted without deviating from teachings of the embodiment.

Figure 2:
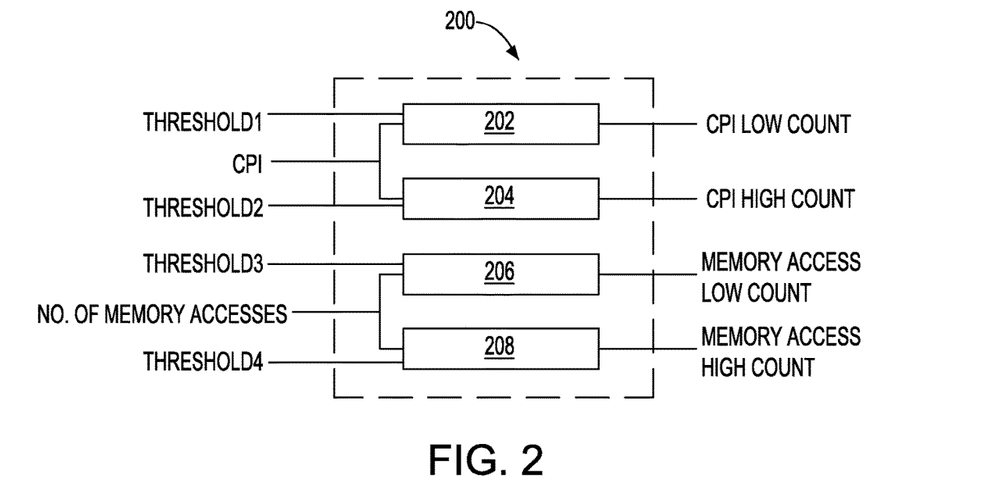
FIG. 2 is a schematic of an exemplary apparatus of the branch adjustment (ADJ) Unit.
Figure 3:
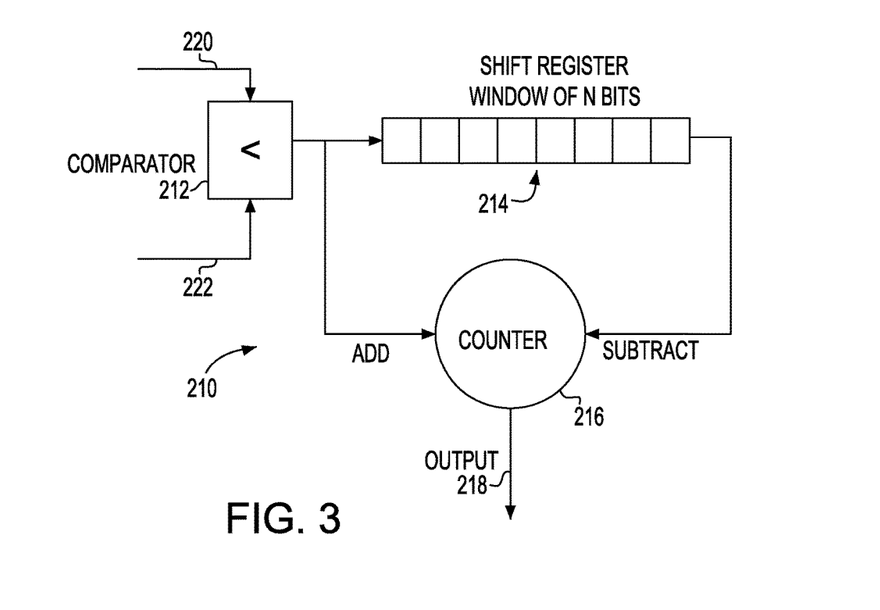
FIG. 3 is a schematic of a circuit in the branch adjustment Unit.

FIG. 2 and FIG. 3 depict a schematic exemplary device or circuit arrangement for the branch prediction adjustment unit 122 (FIG.1). It may be implemented in hardware, firmware, software, or a combination of some or a combination of all. As will be explained in greater details herein after, the branch prediction adjustment unit 122 uses information provided by the performance monitor logic complex 124 (FIG. 1) to detect periods of high pipeline utilization and high memory bandwidth utilization, and dial down (reduce) the number of levels of branch prediction per thread that are allowed. During periods of low pipeline utilization and low memory utilization, the number of levels of branch predictions allowed can be dialed up (increased) to the maximum levels allowed. The state of activities in the core (processor) can be determined by pipeline and memory utilization. High pipeline and memory utilization indicate high utilization of the core (processor); whereas low pipeline and memory utilization indicate low core (processor) utilization. Stated another way, the core is busy; if the pipeline and memory utilizations are high; whereas the core is not busy (under utilized), if the pipeline and memory utilization is low. By adjusting the number of levels of branch predictions, resource utilization due to branch prediction is reduced; thereby providing more resources for the core to use. This is particularly important for low end processors where resources are scarce (i.e. less than resources available in high end processors).

Referring now to FIG. 2, there is depicted a block diagram of an exemplary embodiment of the branch prediction adjustment unit 122 (FIG.1), which includes circuit arrangements 202, 204, 206, and 208. Circuit arrangement 202 receives as inputs CPI count, threshold 1 and as output CPI Low Count. Circuit arrangement 204 receives as inputs the CPI count, threshold 2, and as output CPI High Count. Circuit arrangement 206 receives as inputs threshold 3, number (No.) of memory accesses per cycle, and as output Memory Access Low Count. Likewise, Circuit arrangement 208 receives as inputs the number of memory accesses within a prescribed time interval, threshold 4, and outputs Memory Access High Count. The thresholds are different, all programmable, and are set based upon empirical information regarding, for example, the typical workloads being executed on the system. For some workloads, a CPI of 0.25 can be regarded as a busy core pipeline; while a CPI of 1.5 can be regarded as a not busy core pipeline. A memory access per cycle (bandwidth or utilization) of 70% or 0.70 of the system maximum can be regarded as a busy memory interface; while a memory access per cycle (bandwidth or utilization) of 10% or 0.10 of the system maximum can be regarded as a not busy memory interface. In these cases, the thresholds are set to numbers that indicate 0.25 for the CPI-Low, 1.5 for CPI-High, 0.70 for Memory Access-High, and 0.10 for Memory Access-Low. If during execution of a workload, the PMU Logic Complex indicates that cycles executed are one (1) billion and instructions executed are five (5) billions, then CPI is calculated as 0.20. If during execution of the workload the PMU Logic Complex indicates the number of memory accesses is one (1) billion in one (1) billion cycles, and the maximum accesses allowable by the system configuration is 1.25 billion in one (1) billion cycles, then the memory access per cycles is 80% or 0.80, which is 80% of the maximum allowed by the system. Therefore, if the threshold for CPI-Low is set at 0.25, then the criterion for CPI- Low has been met. If the threshold for Memory Access-High is set to 0.70, then the criterion for Memory Access-High has also been met. In this example, neither criteria for CPI-High nor Memory Access-Low have been met. The values for the CPI and number of memory accesses are provided by Performance Monitor Unit Logic Complex 124 (FIG. 1), a block diagram and associated description are set forth herein.

The circuit arrangements 202-208 (FIG. 2) are substantial the same. Therefore, only one circuit arrangement 210 is shown in FIG. 3; and it is intended to be replicated or adapted for any or all of the circuit arrangements 202-208. Circuit arrangement 210 includes comparator 212, N- bit shift register 214, and counter 216 coupled as shown in the figure or in some other operative configuration. The embodiment shows the shift register as having eight bits; but the showing is only exemplary to explain the embodiment. It should not be construed as a limitation on the embodiment; since N can be selected, for example, as multiples of eight or any other value selected by the designer. From a global perspective, comparator 212 sequentially compares one of appropriate outputs that indicates the current CPI and Memory accesses in a predefined time interval (FIG. 4) with one of the programmable thresholds CPI Low, CPI high, Number of accesses made to memory in a predefined time interval below a threshold (Memory Access-Low), and Number of accesses made to memory in a predefined time interval above a threshold (Memory Access-High). The operation of the comparator is to indicate whether the threshold is lower than greater than one of the appropriate outputs. Depending on the result of the comparison, a logical "1" is outputted from the comparator which adds to the count, later that logical "1" is subtracted from the counter value when the logical "1" value shifts out of the shift register on overflow of the register at the end of the window of N cycles. The result on output 218 is the overall count for the entity being compared over a moving window of N cycles. If, for example, the circuit arrangement in FIG. 3 were used to measure the overall CPI-Low count in eight clock cycle window, that value would appear on output 218. The CPI (cycles-per-instruction) would be provided on line or terminal 220; whereas the programmable threshold for CPI-Low would be provided on line or terminal 222. To measure the overall CPI-High count, the programmable threshold on line 222 would be changed to a value associated with CPI-High. To obtain a value for the Memory Access-Low count the number of accesses per unit time for the memory is applied to line 220. The programmable threshold for Memory Access-Low is applied to line 222. The same process is followed to obtain the count for Memory Access -High.

Still referring to FIG. 3 with reference from a general perspective, circuit arrangement 210 counts the number of times the CPI or Memory access per cycle (bandwidth or memory utilization), as the case may be, is below or above programmable thresholds in a window of processor cycles. With respect, for example, to CPI-Low, a count enters the shift register 214 in the leftmost register bit and shifts to the next register bit every clock tick. Each stage of the shift register carries a logical "1", if the CPI is less than the threshold that indicates a busy core (i.e. a low CPI-threshold). Similarly, a logical "0" is shifted into the shift register when the CPI is greater than or equal to the threshold (i.e. the core is not busy). The counter counts the total number of times the core is not busy in a window of N cycles (8 in this embodiment). A new value is added to the counter just at the cycle that it is shifted into the register. When the register overflows (i.e. value leaves the register) it is subtracted from the counter; so that an overall count of the times the CPI crosses the threshold for the window is always available on output 218.

Figure 4:
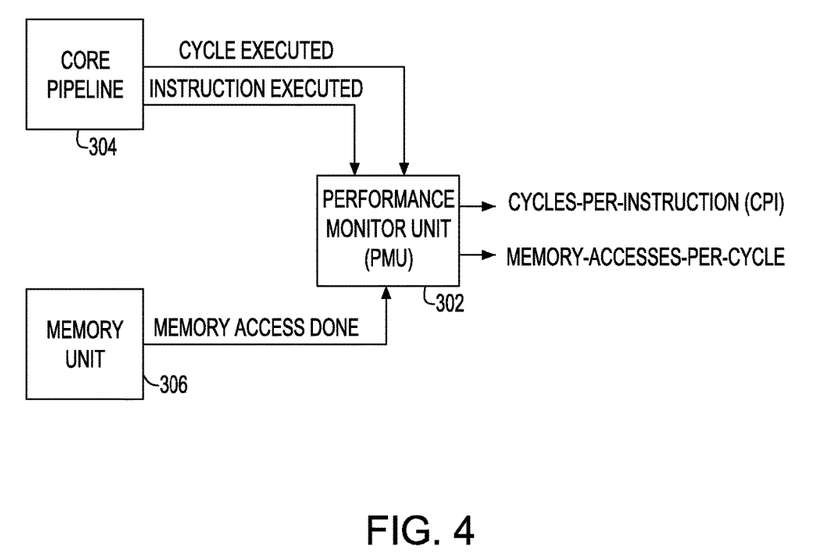
FIG. 4 is a block diagram of the performance monitor (PMU) logic complex.

FIG. 4 is a schematic block diagram of the performance monitor unit logic complex 124 (FIG.1), which, at a high level, includes logic circuits and a plurality of counters. The plurality of counters indicates, for example, bus usage, pipeline utilization, memory utilization, cache memory misses, page faults, branch misses, and other information. The logic circuits monitor the cores to determine, for example, which of the many pipelines and predictive branches actually caused counters to be increased. The counters of interest to the present embodiment are those that keep track of pipeline utilization and memory utilization, which are used to adjust the level or number of branch prediction allowed.

Still referring to FIG. 4 performance monitor unit (PMU) logic complex 124 (FIG. 1) includes PMU 302, Core Pipeline 304, and Memory Unit 306, operatively coupled as shown. The PMU 302 obtains the numbers of cycles and instructions executed from Core Pipeline 304, and the number of memory accesses executed on the memory interface from memory unit 306. From the named entities PMU 304 calculates the current CPI and memory access Per Cycle (bandwidth or memory utilization) for comparison with programmable thresholds, as shown in FIG. 2 and FIG. 3.

Figure 5:
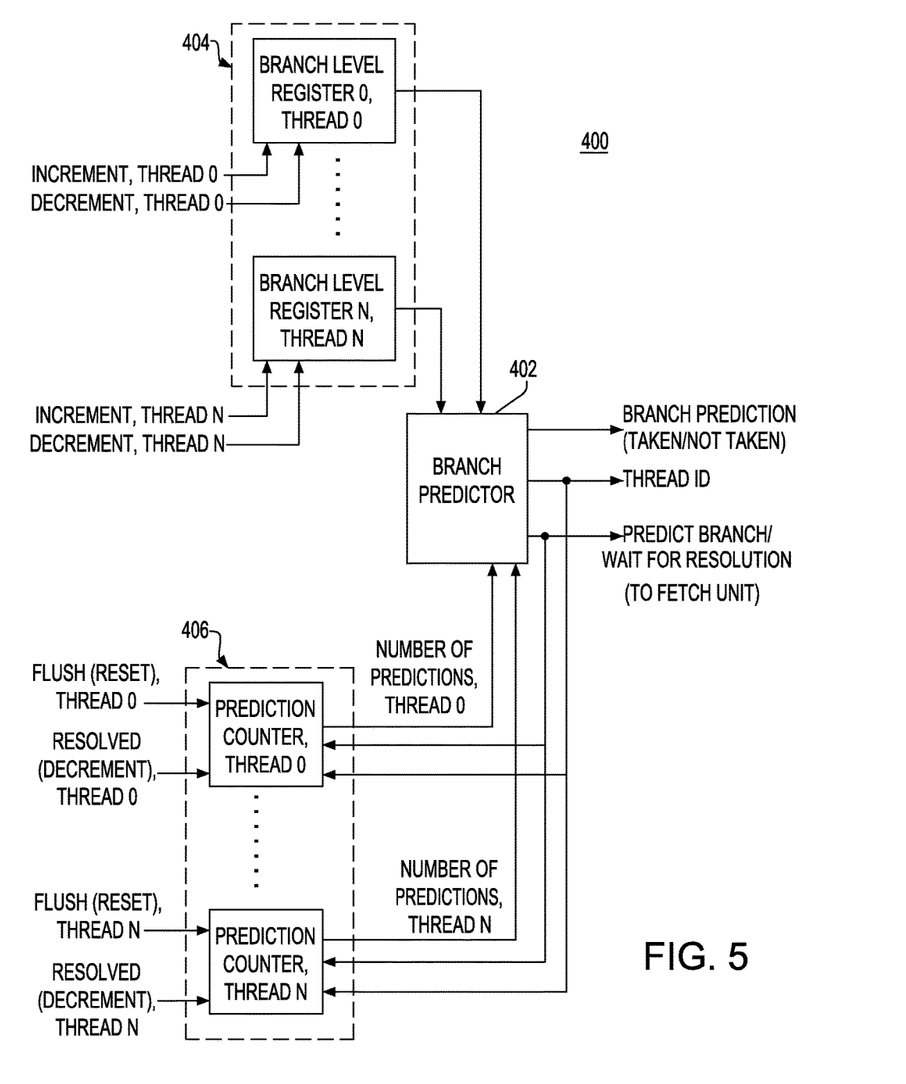
FIG. 5 is a schematic block diagram of the branch prediction logic unit.

FIG. 5 is a schematic block diagram of branch prediction logic arrangement 400, provided in branch prediction unit 126 (FIG.1), which guesses the path through the code that the program is going to take. This allows instructions and data to be loaded ahead of time, which improves performance should the prediction by the branch predictor 402 be correct. Multiple levels of branch predictions are allowed for each thread of the core. The branch prediction logic arrangement 400 comprises Branch Predictor 402 operatively coupled to a Branch Level Register complex 404 and a Prediction Counter complex 406, as shown in FIG. 5. The Branch Level Register complex 404 includes N registers, wherein N is an integer, for example, 3 or 4 per core selected by the designer. Each of the N registers stores a value that is programmable and represents the maximum number of speculative branch predictions allowed for that particular thread. For example, Branch Level Register 0 would store the maximum number of branches (also termed branch levels) allowed for Thread 0. Similarly, other Branch Level Registers would store the maximum number of branches allowed for the corresponding thread. The value in each Register can be incremented or decremented by appropriate signals on the lines labeled increment and decrement, respectively. Each Prediction Counter, in the Prediction Counter complex 406, maintains a count representative of the number of predictive branches completed for the thread with which it is associated. For example, Prediction Counter 0 maintains a count of completed, also referred to as executed, predictions for thread 0 and so forth. The count is incremented when a prediction is made by the branch predictor for the thread as indicated by the Predict Branch and Thread ID (identification)outputs of branch predictor 402. Conversely, Predict Branch is not set and Prediction Counter 406 is not incremented if the predictor indicates to the Fetch Unit (not shown) that it must wait for resolution for the branch. The count in each counter can be Reset with a signal on the line labeled Flush or Decrement with a signal on the line labeled Resolved. It should be noted that when Resolved alone is active, the program has pursued the predicted path; whereas Flush along with Resolved set indicates the program did not pursue the predicted path, and the associated pipeline has to be cleared (Flush).

Still referring to FIG. 5 the branch predictor 402 uses the programmed maximum number of speculative branch predictions or levels per thread 404 and a count of how many unresolved speculative predictions have already been made per thread 406 to determine if it predicts another branch or indicates that the fetch unit (not shown) should wait for resolution of the current branch. If the branch is to be predicted, the Predict Branch output along with the Thread ID is sent to the counter 406 for the thread, which increments the number of speculative predictions that have occurred for the thread, which in turn is compared, in the branch predictor 402, against the allowed number of speculative predictions 404 for that thread. The threshold 404 is incremented or decremented based on the CPI-Low, CPI-High, Memory Access-Low and Memory Access-High counts output in FIG. 3. The count of speculative branch predictions for a thread 406 is decremented when a speculative branch from that thread gets resolved. If the prediction was incorrect and the pipeline must be flushed for a thread, the counter 404 for the thread is reset and new instructions are fetched for the thread.

Figure 6:
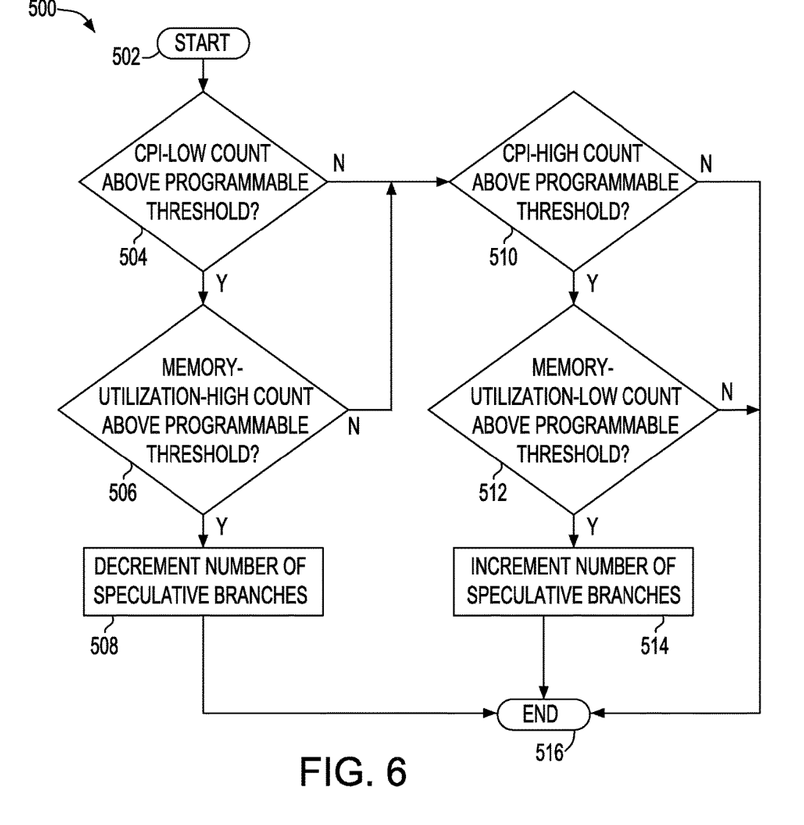
FIG. 6 is a schematic flow chart of the method for adjusting the levels of speculative branches according to an embodiment.

FIG. 6 is a flow chart 500 of an exemplary embodiment of the method to adjust speculative branches according to an embodiment. The values for thresholds in the method MAY Each be different from one another. Also, the other variables, such as CPI-Low count, CPI-High count, Memory Access-Low, and Memory Access-High are provided by the circuit arrangement of FIGS. 2 and 3. It should be noted that Memory Utilization and Memory Access are used interchangeably to indicate utilization of the memory interface. The process begins at step 502 and ends at step 516. At step 504 (cycle- per- instruction) CPI- Low count is compared with a programmable threshold and exit by way (via) the Y (yes) path, if the CPI-Low is above the programmable threshold. The process then enters step 506; where Memory Utilization-High count is compared with another programmable threshold, and exits along the Y path, into step 508, if the Memory Utilization -High count is above the programmable threshold. At step 508, the number of speculative branches is reduced. The reduction can be done sequentially or otherwise. For example, if the maximum number of allowed speculative branches is 4, the reduction could be from 4 to 3 to 2 to 1 to 0 or skipping levels as a designer chooses. With reference to step 504, if CPI-Low is below the programmable threshold, the program exists along the N path into step 510. Likewise, at step 506, if the Memory-High count is below the programmable threshold, the program exits along the N path into step 510, whereat the CPI-High count is compared with another threshold and exits along the Y path, into step 512, if the CPI-High count is above another programmable threshold. At step 512, the program compares the Memory Utilization (Access)-Low count with another programmable threshold and exit along the Y path, into step 514, if the Memory Access- Low count is above the programmable threshold. At step 514, the number of speculative branches is increased from its current value to the maximum allowable value. The increase may be sequential or some other increment selected by the designer. With respect to step 510 and step 512, if respective counts are below respective thresholds the program exits along the N path into END. The program or process is executed periodically.

Figure 7:
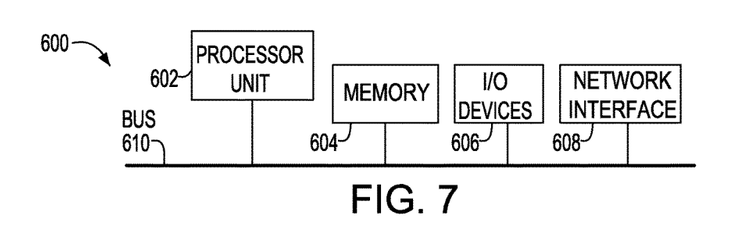
FIG. 7 is a schematic demonstrating a computer system in which some or all of the method steps, in accordance to an embodiment, may be practiced.

FIG. 7 depicts a computer system 600, which may be used to implement the method of the embodiment. The computer system 600 includes bus 610 to which processor unit 602, memory 604, I/0 devices 606, and network interface 608 are operatively coupled. The processor unit 602 may include a system including one or more multi core processors, for example the one demonstrated in FIG.1, POWER7, or any other type of commercially available processor, scheduled with tasks, features, and structures according to the embodiment set forth herein. The memory 604 provides storage facility, whereas the network interface 608 provides connectivity to other systems over networks, such as local area, World Wide Web (also known as internet) or others. The I/0 devices 606 provide the facility for a user to communicate with the system. To this end, the I/0 devices may include key boards, pointing devices, for example a mouse or the like. Also, the I/0 devices may provide a port to which computer readable media such as, for example, flexible disk, CD-ROMs or the like carrying computer readable code may be inserted.

With the multiple levels of branch predictions available to each core on behalf of a thread the embodiment adjusts the multiple levels of branch predictions when the processor (in this case a core) follows a different path in the code than the path predicted as a result of branch prediction. One of the areas of concern is in the multiple levels of branch prediction available to each core on behalf of a thread. By way of example, processors, such as the Power7 chip, allows a number of levels of branch predictions to be made for a thread. Each level indicates a branch prediction and subsequent fetch of instructions along the predicted path. For example, after the first branch prediction is made ("Level 1") and instructions down the predicted path are fetched and executed, including speculative loads and stores, another branch may be encountered for which another speculative branch prediction is made ("Level 2"). The process repeats until a maximum number of levels of branch predictions and predicted paths are fetched. If the Level 1 branch prediction turns out to be wrong, then all instructions after that branch including those from Level 2 and lower levels must be flushed. As an additional consequence, any loads or stores that were speculatively executed may have data "polluting" some number of cache levels in the machine, meaning that the load or store (e.g., read-with-intent-to-modify) data were obtained for a branch path that was actually not executed and which are probably taking up space needed by loads or stores that would occur down the correct branch paths. This means that incorrect speculative branch predictions compound each other with wasted pipeline resource utilization and memory bandwidth utilization, which can occur even if some of the speculative executions would have been correct eventually. This is especially harmful in the low-end systems that may have fewer resources than high end systems.

For some workloads, we often see that running with 2 threads instead of 4 frees up pipeline resources and increases memory bandwidth for a each thread such that performance is improved. However, this technique reduces the number of threads that are running and, therefore, the total amount of work is reduced. What would be better is to reduce the amount of incorrect speculation due to incorrectly predicted branches and the levels of incorrect speculation that ensue. What is needed is a way to detect the high utilization phases and still keep pipeline resources and memory bandwidth utilized to the maximum, but utilized only with work that is correct by reducing this form of speculation in the processor.

With reference to the embodiment, the performance monitor information is used to detect periods of high pipeline and memory bandwidth utilization, and in response dial down the number of levels of branch prediction per thread that are allowed, and thereby reduce resource utilization due to branch prediction behavior in the pipeline and at the memory interfaces. In particular, the performance monitor, currently provided on modern processor chips, provides an indication of cycles-per-instruction (CPI) and memory accesses over time. We have determined that a Low CPI, below a threshold, can indicate a relatively heavily utilized core, while high numbers of memory accesses in a window of cycles, above another threshold, can indicate a relatively heavily utilized memory interface. When both of these programmable thresholds are reached, the processor decides that it is in a high-utilization phase, and it dials back the number of speculative branches per thread that are allowed. If N are typically allowed (usually a small number like 3 or 4), the new limit is N−1. If utilization continues high for another threshold time period of cycles, then the number is dialed back again. This process repeats until no speculative branch predictions are allowed and the processor waits for the actual branch resolution before fetching more instructions. At this point, no speculative instructions are fetched for this thread. Note that if the number of threads is high, the pipeline and memory interfaces may yet still be highly utilized.

Likewise, when utilization drops below one or both utilization thresholds, the number of speculative branches that are allowed is incremented back up, e.g. N−3 gets incremented to N−2. If utilization continues low for another threshold time period, the number gets incremented again. The programmable threshold time periods guarantee that the pipeline is not reconfigured too often, which can reduce performance for a thread. In another embodiment, each thread could have its own number of allowed speculative branches, which would be decremented or incremented as the resolutions for its branches were found to be incorrect (assuming utilizations are still high) or correct (assuming one of more utilizations drops below threshold), which would reward predictable threads with more resources, since they are not being wasted. This embodiment would require a fairness logic to keep one thread from eating up too much more resources than any other thread, and would allow any thread to make reasonable forward progress.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium having computer-usable program code stored in the medium.

Any combination of one or more computer usable or computer readable storage medium(s) may be utilized. The computer usable or computer readable storage medium may be, for example but not limited to, an electronic, magnetic, optical, electromagnetic, infrared, or semiconductor system, apparatus, or device. More specific examples (a non-exhaustive list) of computer usable mediums would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer usable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The computer program code may execute entirely on a user's computer as a stand-alone software package or as an integrated component of a larger software package, partly on the user's computer and partly on a remote computer or entirely on remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The following description will indicate where specific program code is or can be executed in a network of computer devices.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising
   providing a computer system that includes a processor having at least one processor core and a predefined number of speculative branches;
   providing a memory coupled to said computer system wherein said memory includes a memory interface;
   determining a number of accesses made to said memory in a specified time interval; and
   adjusting the predefined number of speculative branches based on the number of accesses made to said memory in the specified time interval wherein performance of the processor is enhanced when the predefined number of speculative branches is adjusted based on the number of accesses made to said memory in the specified time interval.

2. The method of claim 1 wherein the predefined number of speculative branches is reduced, when the number of accesses made to said memory in the specified time interval is high, above a prescribed threshold.

3. The method of claim 1 wherein the predefined number of speculative branches is increased, when the number of accesses made to said memory in the specified time interval is low, below a prescribed threshold.

4. The method of claim 1 further including monitoring said at least one processor core to determine a state of utilization phase within said at least one processor core; wherein the state of utilization phase of said monitored at least one processor core is determined by setting a first threshold, representative of a desired level of utilization, within said at least one processor core; obtaining a count for cycles-per-instruction (CPI) for said at least one processor core; comparing the count for the CPI with the first threshold; and indicating the state of utilization phase, which indicates utilization of said at least one processor core, as heavy when count for the CPI falls below the first threshold.

5. The method of claim 1 further including monitoring the memory interface to determine number of accesses per unit time; determining utilization of said memory by setting a threshold representative of desired memory accesses over a period of time; obtaining a count for memory accesses in a window of cycles; comparing the count for memory accesses with the threshold; and flagging a state of utilization of said memory as heavy, when the count for memory accesses is above the threshold.

6. The method of claim 1 wherein the predefined number of speculative branches is N, wherein N is an integer.

7. The method of claim 6 wherein the act of adjusting the predefined number of speculative branches includes reducing the predefined number of speculative branches when the number of accesses made to said memory in the specified time interval is high, above a prescribed threshold.

8. The method of claim 6 wherein the act of adjusting the predefined number of speculative branches further includes increasing the predefined number of speculative branches from a current level below a maximum level allowed to the maximum level allowed, when the number of accesses made to said memory in the specified time interval is low, below a prescribed threshold.

9. The method of claim 6 wherein the predefined number of speculative branches N, wherein N is 3, is dialed down (reduced), when the number of accesses made to said memory in the specified time interval is high, above a prescribed threshold.

10. The method of claim 9 wherein the dialing down is performed sequentially.

11. The method of claim 1 further including setting a first threshold representative of a desired level of utilization within said at least one processor core; setting a second threshold representative of a desired number of memory accesses within a prescribed time interval; determining a value for a CPI count of said at least one processor core; determining a value for number of memory access count within a window of cycles; comparing the value for the CPI count with the first threshold; comparing the value for the number of memory access count with the second threshold; and adjusting the predefined number of speculative branches down, when the value for the CPI count falls below the first threshold and the value for the number of memory access count is greater than the second threshold.

12. The method of claim 1 wherein the predefined number of speculative branches is dialed up (increased) from a value less than N, wherein N=3, when the number of accesses made to said memory in the specified time interval is low, below a prescribed threshold.

13. The method of claim 12 wherein the dialing up is performed sequentially.

14. The method of claim 1 further including providing multiple threads in said at least one processor core.

15. The method of claim 14 wherein the predefined number of speculative branches is provided in each thread, and the adjustment to said predefined number of speculative branches in each thread is based on activities in said at least one processor core and the number of accesses made to said memory in a specified time interval wherein the number of accesses made to said memory in the specified time interval is determined at the memory interface.

16. The method of claim 1 further including determining CPI (cycles-per-instruction) for said at least one processor core.

17. The method of claim 16 further including decrementing the number of speculative branches when a count for CPI low is above a programmable threshold and a count for memory utilization high is above a programmable threshold.

18. The method of claim 16 further including incrementing the number of speculative branches when a count for CPI high is above a programmable threshold and a count for memory utilization low is above a programmable threshold.

19. A system comprising:
a processor including at least one processor core for processing data;
a memory coupled to said processor;
branch prediction logic circuit arrangement including at least one register storing a value representing number of levels of speculative branches that the processor core may traverse in processing a piece of code;
performance monitor circuit arrangement, including counters, monitoring the at least one processor core to provide a first count indicating cycles-per-instruction (CPI) and for monitoring the memory to provide a second count representing number of memory accesses (NMA) within a prescribed number of processor core cycles; and
branch prediction adjustment circuit arrangement responsive to the first count and the second count to perform one of dialing down and dialing up the number of levels of speculative branches.

20. A computer program product comprising:
a non-transitory computer readable medium embedded with program codes, said program codes including program code for receiving a value representative of a number of speculative branches allowed in a processor having at least one core;
program code for receiving a first count representing one of CPI-low and CPI-high wherein CPI-low is a CPI value that is lower than a prescribed threshold and CPI-high is a CPI value that is higher than a prescribed threshold;
program code for setting a first threshold;
program code for correlating the first threshold with the first count so received;
program code for receiving a second count representing one of Memory utilization low and Memory utilization high wherein Memory utilization includes determining at a memory interface a number of accesses made to a memory in a specified time interval, memory utilization low being a memory utilization value that is lower than a prescribed threshold and memory utilization high being a memory utilization value higher than a prescribed threshold;
program code for setting a second threshold;
program code for correlating the second threshold with the second count so received; and
program code for adjusting the number of speculative branches allowed based on a result from the correlation between the first threshold and the first count and a result from the correlation between the second threshold and the second count.

21. The computer program product of claim 20 wherein the program code for adjusting the number of speculative branches allowed adjusts the number of speculative branches allowed from a current value by decrementing it when the first count representing CPI-Low is above the first threshold and the second count representing Memory utilization-High is above the second threshold.

22. The computer program product of claim 20 wherein the program code for adjusting the number of speculative branches allowed further includes program code for increasing the number of speculative branches allowed from a level lower than a maximum number of speculative branches allowed when the first count representing CPI-High is above the first threshold and the second count representing Memory Utilization-low is above the second threshold.

* * * * *